US006455642B1

(12) United States Patent
Myhre et al.

(10) Patent No.: US 6,455,642 B1
(45) Date of Patent: Sep. 24, 2002

(54) PROCESS FOR PRODUCING A HOMOGENEOUS POLYETHYLENE MATERIAL IN THE PRESENCE OF A CATALYST

(75) Inventors: Ole Jan Myhre, Pregarten (AT); Auli Nummila-Pakarinen, Porvoo (FI); Jarmo Lindroos, Stathelle (NO); Päivi Waldvogel, Porvoo; Thomas Garoff, Helsinki, both of (FI)

(73) Assignee: Borealis Technology Oy, Porvoo (FI)

( * ) Notice: Subject to any disclaimer, the term of this patent is extended or adjusted under 35 U.S.C. 154(b) by 0 days.

(21) Appl. No.: 09/674,854

(22) PCT Filed: May 10, 1999

(86) PCT No.: PCT/FI99/00392

§ 371 (c)(1),
(2), (4) Date: Nov. 7, 2000

(87) PCT Pub. No.: WO99/58584

PCT Pub. Date: Nov. 18, 1999

(30) Foreign Application Priority Data

May 8, 1998 (FI) .................................................. 981034

(51) Int. Cl.[7] .............................. C08F 4/44; C08F 4/654
(52) U.S. Cl. ........................ 526/64; 526/65; 526/124.2; 526/348.1; 526/901; 526/905; 525/240
(58) Field of Search .............................. 526/64, 65, 905

(56) References Cited

U.S. PATENT DOCUMENTS

| 4,859,749 A | | 8/1989 | Franke |
| 5,326,835 A | * | 7/1994 | Ahvenainen et al. ......... 526/64 |
| 5,405,901 A | | 4/1995 | Daniell et al. |
| 5,494,965 A | * | 2/1996 | Harlin et al. |
| 5,684,097 A | * | 11/1997 | Palmroos et al. ............. 526/64 |
| 6,096,837 A | * | 8/2000 | Palmroos et al. ............. 526/64 |
| 6,329,054 B1 | * | 12/2001 | Rogestedt et al. .......... 428/378 |

FOREIGN PATENT DOCUMENTS

| EP | 0 517 868 B1 | 12/1992 |
| EP | A1688794 | 12/1995 |
| EP | 0 691 353 A12 | 1/1996 |
| EP | 0 754 708 A2 | 1/1997 |
| WO | WO 96/18662 | 6/1996 |

* cited by examiner

Primary Examiner—David W. Wu
Assistant Examiner—R. Rabago
(74) Attorney, Agent, or Firm—Birch, Stewart, Kolasch & Birch, LLP

(57) ABSTRACT

The present invention concerns a process for producing homogeneous polyethylene materials and processes for making high density, medium density and low density films therefrom. The process involves producing a polyethylene composition in a multistage reaction sequence of successive polymerization stages in the presence of an ethylene-polymerizing catalyst system. According to the invention, the process is carried out using an unsupported catalyst having magnesium and titanium as active constituents, in at least one loop polymerization stage and at least one gas phase polymerization stage and, operated with different amounts of hydrogen and comonomers to produce a high molecular weight portion in one of the polymerization stages and a low molecular weight portion in another so as to provide a polyethylene composition with the low molecular weight part having a $MFR_2$ of 250 g/10 min or more. With this process it is possible to obtain homogeneous bimodal polyethylene material.

57 Claims, No Drawings

PROCESS FOR PRODUCING A HOMOGENEOUS POLYETHYLENE MATERIAL IN THE PRESENCE OF A CATALYST

This application is the national phase under 35 U.S.C. § 371 of PCT International Application No. PCT/FI99/00392 which has an International filing date of May 10, 1999, which designated the United States of America.

FIELD OF THE INVENTION

The present invention relates to a process for polymerising ethylene in two or more stages to produce a homogeneous polyethylene material that is advantageously used in film-making. More particularly, the invention relates to a process comprising a loop and a gas phase reactor, where the material has a good homogeneity and the fines level of the polymer powder is low.

BACKGROUND OF THE INVENTION

A number of processes designed to produce bimodal polyethylene are known in the art. Processes comprising two or more cascaded slurry reactors are known to produce homogeneous polyethylene materials having a good processability in the end use applications. However, these processes have a limitation of only being able to produce bimodal polyethylenes having a relatively high density, higher than about 935 kg/m$^3$.

On the other hand, processes disclosing the use of two or more cascaded gas phase reactors are also known in the art. These processes have the advantage of being able to produce polyethylenes over a wide density range. However, the homogeneity and processability of the materials produced in these processes and which are available on the market have not been on such a level that they could seriously compete with the materials produced in the processes comprising cascaded slurry reactors.

A process comprising a cascade of a loop and a gas phase reactor is also known in the art. While this kind of a process can successfully be used to produce polyethylenes with a fairly good balance between processability and homogeneity over a fairly broad density range, they have occasionally shown problems to produce very demanding materials having a good homogeneity. Typical examples of such materials are bimodal film materials, especially bimodal high density film material. Also high density pipe materials can be included into this product category.

DESCRIPTION OF RELATED ART

Processes to produce bimodal materials for high density PE film are known from e.g. EP-B-517868, EP-A-691353 and WO-A-9618662.
EP-B-517868

The patent discloses a process for producing bimodal polyethylene in a loop and a gas phase reactor. The publication teaches the use of different inert hydrocarbons as a diluent in the loop reactor, but it states that propane, especially in supercritical conditions, is preferred. The publication does not refer to the homogeneity of the film material nor does it discuss the possibilities to reduce the level of the fine polymer particles. Silica based catalyst has been used in all examples.
WO-A-9618662

The patent application discloses a process comprising at least two loop reactors and at least one gas phase reactor. It also teaches the preparation of material to be used in HD film applications. Again, the publication mentions that different inert hydrocarbons can be used as a diluent in the loop reactor, but that specifically propane especially in supercritical state is preferred. The document discusses both the homogeneity of the film material and the level of fine polymer, and teaches that the homogeneity can be improved and the fines level can be reduced by installing a prepolymeriser in the process. Also this document discloses only the use of silica-supported catalysts.
EP-A-691353

The patent application discloses a process for producing an in situ blend of ethylene polymers giving a low gel film. The process comprises two gas phase reactors. A low MFR copolymer is made in the first reactor and a high MFR copolymer is made in the second reactor.
EP-A-754708

The patent application discloses a process for producing an in situ polyethylene blend. The modality of the polymer is increased by adding into the first reactor a saturated alicyclic hydrocarbon, which is liquid at process conditions. The addition of the saturated alicyclic hydrocarbon reduced the gel level of the film made of the polymer.

The document also discloses that the gas phase processes have problems with the resulting material having a too high level of gels compared with slurry or solution processes. Further, it reveals that the gas phase resins exhibit significant compositional, molecular and rheological heterogeneities. The use of a non-supported catalyst is disclosed in the document.
U.S. Pat. No. 4,859,749

The patent discloses a two stage polymerization process of ethylene, which uses a catalyst which consists of (a) a transition metal component which is the reaction product of magnesium alcoholate with a chlorine containing titanium compound and a chlorine containing organoaluminum compound and (b) organoaluminum cocatalyst. The examples disclose that a homogeneous material in a two stage slurry process has been obtained.

SUMMARY OF THE INVENTION

The objective of the present invention is to provide a process for producing polyethylene materials over a wide density range with good processability in the end use applications and an excellent homogeneity. In particular, it is an aim to provide a process for producing homogeneous polyethylene film and pipe materials having a good processability.

It is a further objective of the invention to provide a film-making process.

These and other objects, together with the advantages thereof over known processes and products, which shall become apparent from the specification which follows, are accomplished with the invention as hereinafter described and claimed.

According to the present invention, bimodal polyethylene materials having a very broad molecular weight distribution are prepared in at least two of the stages in a process comprising a cascade of one or more loop reactor(s) and one or more gas phase reactor(s). The invention is based on the surprising finding that the homogeneity of the material can be improved by performing the polymerization in the presence of a specific catalyst. The catalyst is unsupported and comprises titanium and magnesium as active constituents.

The homogeneous material is produced by polymerizing or copolymerizing ethylene in the presence of a ethylene-polymerizing catalyst system in a reactor cascade formed by at least two reactors, one of which is a gas phase reactor and one of which is a loop reactor, said loop reactor being operated with an inert hydrocarbon, namely linear or branched aliphatic $C_3$–$C_6$-hydrocarbon. The reactors are operated with different amounts of hydrogen and comonomers to produce a high molecular weight portion in one of the reactors and a low molecular weight portion in the other, so as to provide a bimodal polyethylene composition comprising a relatively low molecular weight part and relatively high molecular weight part.

In particular, the present invention comprises a process for polymerising ethylene and comonomer(s) in at least two stages, in a process comprising a loop and a gas phase reactor, of which (i) in the first stage, a low molecular weight, relatively high density polymer fraction having a melt flow rate $MFR_2$ of at least 250 g/10 min is prepared in one or more loop reactor(s) in the presence of an unsupported ethylene-polymerizing catalyst system which comprises titanium and magnesium as active components, and (ii) in the second stage, a high molecular weight, relatively low density copolymer is produced in one or more gas phase reactor(s) using an alpha-olefin, like 1-butene, 1-hexene or 1-octene, as a comonomer. The polymerization conditions are selected so that the final polymer has a predetermined melt flow rate, preferably so that $MFR_5$ is 0.7 g/10 min or less.

More specifically, the present process is a process for producing polyethylene compositions comprising bimodal ethylene homo- and copolymers in a multistage reaction sequence of successive polymerization stages in the presence of an ethylene-polymerizing catalyst system characterized by using an unsupported catalyst comprising magnesium and titanium as active constituents, and carrying out the process in at least one loop polymerization stage and at least one gas phase polymerization stage, operated with different amounts of hydrogen and comonomers to produce a high molecular weight portion in one of the polymerization stages and a low molecular weight portion in another so as to provide a polyethylene composition with the low molecular weight part having a $MFR_2$ of 250 g/10 min or more.

The HD polyethylene film-making process is a process for producing high density polyethylene films, comprising producing a polyethylene composition in the presence of an ethylene-polymerizing catalyst system comprising an unsupported catalyst comprising magnesium and titanium as active constituents, in a multistage reaction sequence of successive polymerization stages, at least one of which is a loop polymerization stage and at least one of which is a gas phase polymerization stage, operated with different amounts of hydrogen and comonomers to produce a high molecular weight portion in one of the polymerization stages and a low molecular weight portion in another so as to provide a bimodal high density polyethylene with a low molecular weight part having a density above 960 kg/m$^3$ and a high molecular weight part, the composition having a density of 940–965 kg/m$^3$ and $MFR_{21}$ of 3–50 g/10 min, and blowing said polyethylene composition to a film.

The medium density polyethylene film-making process is characterized by a process for preparing medium density polyethylene films, comprising producing a polyethylene composition in the presence of an ethylene-polymerizing catalyst system comprising an unsupported catalyst comprising magnesium and titanium as active constituents, in a multistage reaction sequence of successive polymerization stages, at least one of which is a loop polymerization stage and at least one of which is a gas phase polymerization stage, operated with different amounts of hydrogen and comonomers to produce a high molecular weight portion in one of the polymerization stages and a low molecular weight portion in another so as to provide bimodal medium density polyethylene with a low molecular weight part having a density of 940–980 kg/m$^3$ and a high molecular weight part, the composition having a density of 925–940 kg/m$^3$ and $MFR_{21}$ of 7–30 g/10 min, and blowing said polyethylene composition to a film.

The low density polyethylene film-making process is characterized by a process for preparing low density polyethylene films, comprising producing a polyethylene composition in the presence of an ethylene-polymerizing catalyst system comprising an unsupported catalyst comprising magnesium and titanium as active constituents, in a multistage reaction sequence of successive polymerization stages, at least one of which is a loop polymerization stage and at least one of which is a gas phase polymerization stage, operated with different amounts of hydrogen and comonomers to produce a high molecular weight portion in one of the polymerization stages and a low molecular weight portion in another so as to provide bimodal low density polyethylene with a low molecular weight part having a density of 935–960 kg/m$^3$, and a high molecular weight part, the polyethylene composition having a density of 915–930 and $MFR_{21}$ of 10–50 g/10 min or more, and blowing said polyethylene composition to a film.

An important advantage of the present process is that it provides material for blown films with good mechanical properties and good appearance in a process where the whole range of PE products from LLD to HD can be produced.

By means of the invention it is possible to produce polyethylene material with improved homogeneity without the use of prepolymeriser (unless it is considered otherwise necessary).

The tear strength and good processability on a film line make the present materials useful for production of thin films of thicknesses in the range of 5 μm, or even less than 5 μm to over 30 μm. Films made from the materials also exhibit good barrier properties to water vapour.

Next, the invention will be more closely examined with the aid of the following detailed description.

DETAILED DESCRIPTION OF THE INVENTION

Definitions

For the purpose of the present invention "loop reactor" designates a reactor made of a conduit forming a closed loop and through which the polymer slurry, where the catalyst and the polymer produced in the reactor are suspended in a fluid phase consisting of diluent, monomer, possible comonomers and hydrogen. The fluid phase may also contain small amounts of additives, e.g. to reduce the static electricity. The reactor may be operated continuously or intermittently.

By "gas phase reactor" is meant any mechanically mixed or fluidized bed reactor, where polymer particles are suspended in a gas consisting of monomer, comonomer(s) and eventually hydrogen and/or inert gas. Preferably the gas phase reactor comprises a mechanically agitated fluidized bed reactor with gas velocity of at least 0.2 m/s.

"Melt flow rate", or abbreviated MFR, is a measure of the melt viscosity and thus also of the molecular weight of the polymer. A high value of MFR corresponds to a low molecular weight. It is measured by pressing the polymer melt through a standard cylindrical die at a standard temperature in a special measuring device (melt indexer) equipped with a standard piston under a standard load. For polyethylene, the melt flow rate is measured at 190° C. The abbreviation MFR is usually provided with a numerical subscript, which indicates the load under which the measurement was made. Thus, $MFR_2$ designates that the measurement was performed under 2.16 kg load and $MFR_{21}$ designates that the measurement was performed under 21.6 kg load. The determination of MFR is described e.g. in ISO 1133 C4, ASTM D 1238 and DIN 53735.

By "flow rate ratio", or abbreviated FRR, is meant a ratio between two MFR values measured from the same polymer using different loads. The abbreviation FRR is usually provided with a numerical subscript indicating which loads have been used to determine the FRR. Thus, $FRR_{21/2}$ has been calculated as the ratio of $MFR_{21}$ to $MFR_2$. The FRR is a measure of the broadness of the molecular weight distribution. A high FRR corresponds to broad molecular weight distribution.

The complex viscosity at $G^*=5$ kPa, $\eta_{5kPa}$, is measured using a dynamic rheometer. It is the measure of the average molecular weight of the polymer.

The shear thinning index, $SHI_{5/300}$, is defined as the ratio of the viscosity at $G^*=5$ kPa to the complex viscosity at $G^*=300$ kPa. It is a measure of the molecular weight distribution.

The storage modulus, G', at the point where the loss modulus G" has a specified value of 5 kPa, denoted as $G'_{5 kPa}$, is also a measure of molecular weight distribution. It is sensitive to very high molecular weight polymer fraction.

The Polymer Composition

The present invention concerns a process for producing polyethylene compositions having a bimodal molar mass distribution comprising a relatively high molar mass portion and a relatively low molar mass portion.

The process is especially advantageous for producing ethylene (co)polymer compositions having a broad molecular weight distribution and a high average molecular weight, and in particular compositions which are used in applications where homogeneity is important, such as film or pipe. Typically, in these compositions the $MFR_2$ of the low molecular weight fraction is higher than 250 g/10 min.

The low molecular weight fraction of the polyethylene composition produced with the process according to the present invention has a $MFR_2$ of 250 g/10 min or more, preferably approximately 300–1000 g/10 min. The $MFR_{21}$ of the final polymer composition is 50 g/10 min or less. Alternatively or additionally the $MFR_5$ of the final composition is 0.7 g/10 min or less or the $MFR_{21}$ of the final polymer composition is 20 g/10 min or less.

The density of the low molecular weight fraction is typically 935 kg/m³ or more, in particular 935–980 kg/m³. The density of the final polymer composition can vary greatly, since polymer compositions with a density in the range of 915–965 kg/m³ can be produced with the process of the present invention.

The weight fraction of the low molecular weight material should be within 5–95% of the final polymer composition. Accordingly, the fraction having a relatively high molecular weight should have such average molecular weight and comonomer content that the final bimodal ethylene polymer or copolymer composition has the above-described melt flow rate and density.

According to a preferred embodiment, the ethylene polymer or copolymer composition produced with the process of the present invention comprises a low molecular weight part with a density above 960 kg/m³ and a high molecular weight part, said composition having a density of 940–965 kg/m³ and $MFR_{21}$ of 3–50 g/10 min, preferably 3–15 g/10 min.

The $SHI_{5/300}$ of the composition satisfies the relationship $$SHI_{5/300} \leq 0.00014 \cdot \eta_{5kPa} + 78, \text{ and}$$

$G'_{5kPa}$ satisfies the relationship $$G'_{5kPa} \geq 28 \cdot SHI_{5/300} + 425.$$

According to another preferred embodiment, the ethylene polymer or copolymer composition produced with the process according to the present invention comprises a low molecular weight fraction having a melt flow rate $MFR_2$ within 300–1000 g/10 min, preferably within 300–600 g/10 min and a density between 960–980 kg/m³. The weight fraction of the low molecular weight fraction is within 5–95%, preferably 20–55% and in particular 35–50% of the final polymer composition. The composition further comprises a high molecular weight fraction, and the final ethylene polymer or copolymer composition has a melt flow rate $MFR_{21}$ within 3–50 g/10 min, preferably within 3–15 g/10 min and a density within 940–965 kg/m³.

The composition described in either one of the two passages above is advantageously used to produce high density films. Typically, the film blown from said composition has a dart drop higher than 200 g, preferably over 350 g. The number of gels is typically lower than 50, preferably lower than 20 and in particular lower than 10 according to the gel determination method presented below.

According to yet another preferred embodiment, the ethylene polymer or copolymer composition produced with the process according to the present invention comprises a low molecular weight fraction having a melt flow rate $MFR_2$ within 250–1000 g/10 min, preferably within 300–600 g/10 min and a density between 940–980 kg/m³. The weight fraction of low molecular weight material is within 20–60%, preferably 30–50% and in particular 40–50% of the final polymer composition. Said composition further comprises a high molecular weight fraction. The final ethylene polymer or copolymer composition has a melt flow rate $MFR_{21}$ within 2–50 g/10 min, preferably within 3–15 g/10 min and density within 930–965 kg/m³. This kind of composition is advantageously used for manufacturing pipes.

According to another preferred embodiment of the invention, the ethylene polymer or copolymer composition produced with the process according to the present invention comprises a low molecular weight fraction having a melt flow rate $MFR_2$ of 250–1000 g/10 min, preferably 300–500 g/10 min and a density in the range of 940–980 kg/m³. The weight fraction of low molecular weight material within 5–95%, preferably 20–50% and in particular 35–50% of the final polymer composition. The composition further comprises a high molecular weight fraction. The final ethylene polymer or copolymer composition has a melt flow rate $MFR_{21}$ within 7–30 g/10 min, preferably within 10–25 g/10 min and a density within 925–940 kg/m³. This kind of composition is advantageously used for producing medium density films.

According to still another preferred embodiment of the invention, the ethylene polymer or copolymer composition produced with the process according to the present invention comprises a low molecular weight fraction having a melt flow rate $MFR_2$ of 250–1000 g/10 min, preferably 300–500 g/10 min an a density in the range of 935–960 kg/m³. The weight fraction of low molecular weight material within 5–95%, preferably 20–50% and in particular 35–50% of the final polymer composition. The composition further comprises a high molecular weight fraction. The final ethylene polymer or copolymer composition has a melt flow rate $MFR_{21}$ within 10–50 g/10 min, preferably within 15–25 g/10 min and a density within 915–930 kg/m³. This kind of composition is advantageously used for producing low density films.

In addition to the polyethylene compositions described above, it is clear that the process according to the present invention is also suitable for producing less demanding polyethylene materials having a narrower molecular weight distribution and/or a lower molecular weight.

Polymerization Process

To produce the polymer compositions, ethylene is polymerized in the presence of a suitable catalyst, preferably a Ziegler-Natta catalyst (cf. below), at an elevated temperature and pressure. Polymerization is carried out in a cascade comprising polymerization reactors selected from the group of loop and gas phase reactors.

In addition to the actual polymerization reactors used to produce the bimodal ethylene homo- or copolymer, the polymerization reaction system optionally comprises a number of additional reactors, such as prereactors. The prereactors include any reactor for prepolymerizing or precontacting the catalyst or modifying the olefinic feed, if necessary. All reactors of the reactor system are preferably arranged in a cascade.

In the following description the reactor system is described to comprise one loop reactor (referred to as "the first reactor") and one gas phase reactor (referred to as "the second reactor"), in that order. However, it should be understood that the reactor system can comprise the reactors in any number. In principle, the reactors can also be arranged in any order. Preferably, however, the loop reactor(s) is arranged prior to the gas phase reactor(s). It is also preferred to produce the low molecular weight part of the polymer composition in the loop reactor, and thus prior to the high molecular weight part of the composition.

In every polymerization step it is possible to use also comonomers selected from the group of $C_{4-10}$ olefins, such as 1-butene, 1-pentene, 1-hexene, 4-methyl-1-pentene, 1-heptene, 1-octene, 1-nonene and 1-decene. It is also possible to use two or more olefins selected from said group. Preferably a higher alpha-olefin, such as 1-butene, 1-hexene, 4-methyl-1-pentene or 1-octene is used. In particular, 1-hexene is preferred. It is to be understood that the comonomer used may be the same or different in the different reactors. Preferably, the comonomer is selected so that the boiling point of the comonomer is not close to the boiling point of the diluent, whereby the diluent recovery becomes more economical.

The use of comonomers is particularly preferred for the preparation of the high molar mass portion. The amount of comonomers in the present materials is generally 0 to 5 wt-%, preferably less than about 2 wt-%. The low molecular weight component contains less than about 1 wt-% comonomers.

According to the invention, the polymerization comprises the steps of
subjecting ethylene, optionally hydrogen and/or comonomers to a first polymerization reaction in a first polymerization zone or reactor,
recovering the first polymerization product from the first polymerization zone,
feeding the first polymerization product to a second reaction zone or reactor,
feeding additional ethylene and optionally hydrogen and/or comonomers to the second reaction zone,
subjecting the additional ethylene and optional hydrogen and/or comonomer to a second polymerization reaction in the presence of the first polymerization product to produce a second polymerization product, and
recovering the second polymerization product from the second reaction zone.

Thus, in the first step of the process, ethylene with the optional comonomer(s) together with the catalyst is fed into the first polymerization reactor. Along with these components hydrogen as a molar mass regulator is fed into the reactor in the amount required for achieving the desired molar mass of the polymer. Alternatively, the feed of the first reactor can consist of the reaction mixture from a previous reactor, if any, together with added fresh monomer, optional hydrogen and/or comonomer and cocatalyst. In the presence of the catalyst, ethylene and the optional comonomer will polymerize and form a product in particulate form, i.e. polymer particles, which are suspended in the fluid circulated in the reactor.

The polymerization medium typically comprises the monomer (i.e. ethylene) and/or a hydrocarbon diluent, and optionally hydrogen and/or comonomers. According to the invention, the hydrocarbon diluent mainly comprises a $C_3$–$C_6$ aliphatic linear or branched hydrocarbon or a mixture of two or more of these. Thus, the diluent can be selected from a group comprising propane, n-butane, isobutane, n-pentane, 2-methyl butane, 2,2-dimethyl propane, hexane, 2-methyl pentane, 3-methyl pentane, 2,2-dimethyl butane, 2,3-dimethyl butane and 2-ethyl butane. In particular propane is suitable to be used as a diluent, since it allows the operation in supercritical conditions at a relatively low temperature. According to a preferred embodiment of the invention, a $C_{4-6}$ aliphatic hydrocarbon, such as n-butane, pentane or hexane, and in particular isobutane is used to further improve the homogeneity of the material. According to another preferred embodiment, isobutane, n-butane or isopentane is used. It should be noted, that the diluent may also contain minor amounts of lighter and/or heavier hydrocarbons which are typically found in industrially used hydrocarbon fractions. It is preferred to use light diluents, such as propane, n-butane or isobutane, since these can readily be separated from the polymer.

The polymer is circulated continuously through the loop reactor by means of a circulation pump or by other means of circulation.

The conditions of the loop reactor are selected so that at least 5 wt-%, preferably at least 20 wt-%, most preferably at least 35 wt-%, of the whole production is produced in the loop reactor(s). The temperature is in the range of 40 to 110° C., preferably in the range of 70 to 100° C. The reaction pressure is in the range of 25 to 100 bar, preferably 35 to 80 bar.

In loop polymerization more than one reactor can be used in series. In such a case the polymer suspension in an inert hydrocarbon produced in the loop reactor is fed without separation of inert components and monomers either intermittently or continuously to the following loop reactor, which is operated at a lower pressure than the previous loop reactor.

The polymerization heat is removed by cooling the reactor by a cooling jacket. The residence time in the loop reactor must be at least 10 minutes, preferably 20–100 min for obtaining a sufficient yield of polymer.

As discussed above, hydrogen is fed into the reactor to control the molecular weight of the polymer. Hydrogen is added to the reactor so that the molar ratio of hydrogen to ethylene in the fluid phase of the reactor is at least 100 mol $H_2$/kmol ethylene, preferably 300–600 mol $H_2$/kmol ethylene. It should be noted that the exact amount of hydrogen depends on the desired molecular weight (or MFR) of the polymer produced in the first stage, and thus no exact value can be given.

Comonomer can be introduced into the loop reactor to control the density of the polymer produced in the first polymerization stage. If the final ethylene (co)polymer should have a high density above 940 kg/m$^3$, the molar ratio of the comonomer to the ethylene should be at most 200 mol comonomer/kmol ethylene. If the final ethylene (co)polymer should have a low density below 930 kg/m$^3$, the molar ratio of the comonomer to the ethylene should be between 200–1000 mol comonomer/kmol ethylene, preferably between 300–800 mol comonomer/kmol ethylene. Again, it should be noted that the exact amount of comonomer depends on the desired comonomer content (or density) of the polymer produced in the first stage, and thus no exact value can be given.

If the density of the ethylene (co)polymer produced in the loop reactor is higher than 960 kg/m$^3$, it is advantageous to perform the polymerization in supercritical conditions, above the critical temperature and critical pressure of the fluid which forms the reaction mixture. Typically, the temperature then exceeds 90° C. and the pressure exceeds 55 bar.

The pressure of the first polymerization product including the reaction medium is reduced after the first reaction zone in order to evaporate volatile components of the product, e.g. in a flash tank. As a result of the flashing, the product stream containing the polyethylene is freed from hydrogen and can be subjected to a second polymerization in the presence of additional ethylene to produce a high molar mass polymer.

The second reactor is preferably a gas phase reactor, wherein ethylene and preferably comonomers are polymerized in a gaseous reaction medium.

The gas phase reactor is typically an ordinary fluidized bed reactor, although other types of gas phase reactors can be used. In a fluidized bed reactor, the bed consists of the growing polymer particles from the first reaction zone and/or the polymer particles formed in the bed of the gas phase reactor, as well as the active catalyst which is dispersed within the growing polymer particles. The bed is kept in a fluidized state by introducing gaseous components, for instance monomer on a flowing rate which will make the particles act as a fluid. Typically fluidizing gas is introduced into the bed from the bottom through a fluidization grid. The fluidizing gas consists of monomer and optionally comonomer(s) and/or hydrogen and/or inert gases, like nitrogen, propane, n-butane or isobutane. The fluidizing gas can contain also inert carrier gases, like nitrogen and propane and also hydrogen as a molecular weight modifier. The fluidized gas phase reactor can be equipped with a mechanical mixer.

In order to produce the high molecular weight component in the gas phase reactor, hydrogen can be added into the reactor to control the molecular weight of the final polymer. The concentration of hydrogen in the fluidizing gas shall be such that the molar ratio of hydrogen to ethylene is lower than 100 mol hydrogen/kmol ethylene, preferably lower than 50 mol/kmol. It should be noted that the exact amount of hydrogen depends on the desired MFR of the final ethylene (co)polymer, and thus no exact value can be given.

Comonomer can also be introduced into the gas phase reactor to control the density of the final ethylene (co) polymer. For example, if the final ethylene (co)polymer should have a high density above 940 kg/m$^3$, the molar ratio of the comonomer to the ethylene should be at most 400 mol comonomer/kmol ethylene. If the final ethylene (co)polymer should have a low density below 930 kg/m$^3$, the molar ratio of the comonomer to the ethylene should be between 200–1000 mol comonomer/kmol ethylene, preferably between 300–800 mol comonomer/kmol ethylene. Again, it should be noted that the exact amount of comonomer depends on the desired comonomer content or density of the final ethylene (co)polymer, and thus no exact value can be given.

The gas phase reactor used can be operated in the temperature range of 50 to 115° C., preferably between 60 and 110° C. The reaction pressure is typically between 10 and 40 bar and the partial pressure of monomer between 1 and 20 bar.

The pressure of the second polymerization product including the gaseous reaction medium can then be released after the second reactor in order optionally to separate part of the gaseous and possible volatile components of the product, e.g. in a flash tank. The overhead stream or part of it is recirculated to the gas phase reaction zone.

The production split between the relatively high molar mass polymerization reactor and the relatively low molar mass polymerization reactor is 5–95:95–5. Preferably, 20 to 50%, in particular 35 to 50%, of the ethylene homopolymer or copolymer is produced at conditions to provide a polymer having a MFR$_2$ of 250 g/10 min or more and constituting the low molar mass portion of the polymer, and 95 to 50%, in particular 90 to 50%, of the ethylene homopolymer or preferably copolymer is produced at such conditions that the final polymer has an MFR$_{21}$ of 50 g/10 min or less, in particular about 3 to 50 g/10 min and constituting the high molar mass portion of the polymer.

Catalyst

The catalyst used in the process according to the invention is a Ziegler-Natta catalyst consisting of magnesium and titanium as active metals and aluminium as the chlorinating agent. The catalyst is used unsupported. By "unsupported" it is meant that all the components of the catalyst are catalytically active, and thus no deposition of the active components to a specific carrier (e.g. an inorganic oxide) has been made.

According to a preferred embodiment of the invention, the catalyst is prepared as follows: The magnesium complex (B) needed in preparation of the catalyst is prepared by reacting a suitable alcohol (C) with a magnesium compound (D).

The alcohol (C) must be such that the complex (B) is soluble in non-polar hydrocarbon diluent. For this reason, the hydroxy group of the alcohol should be sterically hindered. Suitable examples of such alcohols are linear or branched $C_4$–$C_{10}$ alcohols, in particular 1-alcohols with a hydrocarbyl, preferably methyl and in particular ethyl or propyl, substituent in the second carbon atom. In particular, 2-ethyl-1-hexanol and 2-propyl-1-pentanol are preferred.

The magnesium compound (D) is a dialkyl magnesium. The two alkyl groups are independently methyl, ethyl, propyl, butyl, pentyl, hexyl, heptyl or octyl. Suitable examples of such compounds are dibutyl magnesium (DBM), butyl ethyl magnesium (BEM) and butyl octyl magnesium (BOMAG).

The molar ratio of the alcohol (C) to the magnesium compound (D) should be within the range of 1.7–2.1, preferably 1.8–2.0.

The magnesium complex (B) is then reacted with an alkyl metal chloride (A) to form magnesium chloride-aluminium complex (E). Thus, the alkyl metal chloride (A) must have a sufficient chlorinating power for this to happen. Alkyl metal chloride has the general formula (I):

$$R_n MeCl_{3-n} \tag{I}$$

wherein each R is independently $C_1$–$C_{10}$, preferably $C_1$–$C_4$ alkyl, Me is a metal of group 13 in the Periodic Table of Elements, preferably Al or B, in particular aluminium and n is an integer 1 or 2. Preferred example of compound (A) is ethyl aluminium dichloride.

The ratio between the magnesium complex (B) and alkyl metal chloride compound (A) should be such that the ratio of chlorine atoms in the compound (A) to the magnesium atoms in complex (B) is between 1 and 2.5, preferably 1.7–2.3. If the ratio is less than 1, the chlorination shall be incomplete. On the other hand, a ratio higher than 2.5 is unnecessary, since complete chlorination is obtained at ratio 2.

The solid catalyst component is then prepared by reacting the magnesium chloride-metal complex (E) with a titanium chloride compound (F). The titanium compound (F) may in addition to titanium and chloride contain alkoxy groups, according to the general formula:

$$TiCl_m(OR)_{4-m} \tag{II}$$

wherein m is an integer from 1 to 4, and in each OR-group independently R is linear or branched aliphatic hydrocarbyl comprising 1–12, preferably 1–4, carbon atoms. Examples of suitable titanium compounds (F) are $Ti(OC_2H_5)Cl_3$, $Ti(OC_2H_5)_2Cl_2$ and $Ti(OC_2H_5)_3Cl$, most preferred is titanium tetrachloride, $TiCl_4$.

The amount of titanium compound (F) is such that the molar ratio of compound (F) to complex (B) is between 1:1.5–1:3, preferably between 1:1.75–1:2.25.

The solid catalyst component may then be washed and dried, as it is known in the art. The washing will remove the impurities possibly remaining in catalyst particles which would have an adverse effect on the activity of the catalyst.

The composition of the thus obtained catalyst is preferably such that aluminium (when Me is aluminium) is present in 1–2 wt-%, magnesium in 8–12 wt-%, titanium in 7–10 wt-% and chlorine in 45–55 wt-%.

Blending and Compounding

The polymer obtained from the reactor is in the form of powder. Generally, the film blowers are not able to use the polymer in the powder form. The powder is transformed to pellets in a compounding step where the polymer is first mixed with additives, like antioxidants and process stabilisers, then melt homogenised in an extruder and finally pelletised.

The extruder used in the compounding can be of any type known in the art. It may be either a single screw extruder which contains only one screw or a twin screw extruder which contains two parallel screws, or a combination of these. Preferably a twin screw extruder is used.

The twin screw extruder may be of either corotating or counterrotating type. In a corotating twin screw extruder the screws rotate in the same direction while in a counterrotating twin screw extruder the screws rotate in the opposite directions. The counterrotating twin screw extruder has the advantage of giving better homogeneity on a certain level of specific energy input. On the other hand, corotating twin screw extruder generally degrades the polymer less on a certain level of specific energy input.

The films are prepared by running the pelletized product into a film on a film line. The die diameter is typically 100–300, in particular 140–200 mm, and the die gap is 1–2 mm, for HD films typically approximately 1.5 mm. The blow-up ratio (BUR), which is the ratio of the diameter of the expanded film bubble to the die diameter, may be 1–10, typically between 2 and 4, and for HD films in particular 4. For HD films the frost line height is usually between 5 and 10 die diameters (DD) and for LLD films between 0 and 4, in particular 2 and 4 DD. Preferably, the material exhibits a neck contraction, so that the effective blow-up ratio ($BUR_{eff}$), which is the ratio of the diameter of the expanded film bubble to the narrowest diameter of the neck, exceeds the BUR based on the die diameter.

Thus, if BUR is about 4, then $BUR_{eff}$ is preferably higher than 5. The thickness of the films prepared according to the present invention is typically 3 μm–100 μm. Thus, it is possible to make thin films of 3–50 μm, in particular 5–30 μm thickness.

The film prepared from the material produced by the process described above has a dart drop of more than 200 g, preferably more than 350 g, tear strength in machine and transverse directions at least 0.1 N, and at least 0.5 N, preferably 1 N or more, respectively. The good homogeneity is manifested by the low amount of gels in an area of A4-size; typically the films prepared according to the invention exhibit gels less than 50, preferably less than 20 and in particular 10 or less in an area of A4 size.

Description of Analytical Methods

Tear Strength

Tear strength is measured according to ISO 6383. The force required to propagate tearing across a film specimen was measured using a pendulum device. The pendulum swings by gravity through an arc tearing the specimen from a precut slit. The specimen is held on one side by the pendulum and on the other side by a stationary member. Tear strength is the force required to tear the specimen.

Gel Count

The film sample (of size A4) was investigated under polarized light and counted. The number of gels per A4 size was then given as the result.

Dart Drop

Dart drop is measured using the ISO 7765-1 method. A dart with a 38 mm diameter hemispherical head is dropped from a height of 0.66 m onto a film clamped over a hole. If the specimen fails, the weight of the dart is reduced and if it does not fail the weight is increased. At least 20 specimen need to be tested. A weight resulting failure of 50% of the specimen is calculated.

Rheological Measurements

The rheology of polymers has been determined using Rheometrics RDA II Dynamic Rheometer. The measurements have been carried out at 190° C. temperature under nitrogen atmosphere. The measurements give storage modulus (G') and loss modulus (G") together with absolute value of complex viscosity (η*) as a function of frequency (ω) or absolute value of complex modulus (G*).

$$\eta^* = \frac{\sqrt{(G'^2 + G''^2)}}{\varpi}$$

$$G^* = \sqrt{(G'^2 + G''^2)}$$

According to Cox-Merz rule complex viscosity function, $\eta^*(\omega)$ is the same as conventional viscosity function (viscosity as a function of shear rate), if frequency is taken in rad/s. If this empiric equation is valid absolute value of complex modulus corresponds shear stress in conventional (that is steady state) viscosity measurements. This means that function $\eta^*(G^*)$ is the same as viscosity as a function of shear stress.

In the present method viscosity at a low shear stress or $\eta^*$ at a low $G^*$ (which serve as an approximation of so called zero viscosity) is used as a measure of average molecular weight. On the other hand, shear thinning, that is the decrease of viscosity with $G^*$, gets more pronounced the broader is molecular weight distribution. This property can be approximated by defining a so called shear thinning index, SHI, as a ratio of viscosities at two different shear stresses.

Thus:

$$SHI_{5/300} = \eta^*_5 / \eta^*_{300}$$

wherein $\eta^*_5$ is complex viscosity at $G^*=5$ kPa and $\eta^*_{300}$ is complex viscosity at $G^*=300$ kPa As mentioned above storage modulus function, $G'(\omega)$, and loss modulus function, $G''(\omega)$, are obtained as primary functions from dynamic measurements. The value of the storage modulus at a specific value of loss modulus increase with broadness of molecular weight distribution. However this quantity is highly dependent on the shape of molecular weight distribution of the polymer.

EXAMPLES

Example 1

Preparation of Complex 8.6 g (66.4 mmol) of 2-ethyl-1-hexanol was added slowly to 27.8 g (33.2 mmol) of 19.9 wt-% butyl-octyl-magnesium. The reaction temperature was kept below 35° C. This complex was used in the catalyst preparation.

Preparation of Catalyst 5.3 g (5.1 mmol) of the above prepared complex was added slowly to 4.7 ml (5.1 mmol) of 20 wt-% EADC, and the mixture was stirred for 12 hours at 25° C. Then, 0.48 g (2.6 mmol) of titanium tetrachloride was added and the mixture was stirred for one hour at 40–50° C. The catalyst was washed with pentane and dried for two hours at 40–50° C.

Composition of the catalyst was: Al 1.4%, Mg 9.5%, Ti 8.9%, Cl 47.2%

Test Polymerization

The above catalyst was tested in ethylene homopolymerization. Hydrogen was measured into a 3 litre autoclave from a 500 ml cylinder so, that the pressure in the cylinder was reduced by 500 kPa. 1.8 l of n-pentane was introduced into the reactor and the temperature was adjusted to 90° C. A measured amount of the above-mentioned catalyst and triethylaluminium cocatalyst (molar ratio of Al/Ti was 15 mol/mol) was introduced into the reactor and ethylene feed was started via the hydrogen measuring cylinder. The reactor was maintained at a constant pressure of 14.4 kPa by continuously introducing ethylene into the reactor (partial pressure of ethylene was 4.4 kPa). The polymerization was continued for one hour, after which the reactor was evacuated, and the polymer was recovered and dried.

The productivity of the catalyst in polymerization was 69 kg PE/g catalyst, the melt flow rate $MFR_2$ was 0.5 g/10 min and the bulk density 320 kg/m$^3$.

Example 2

A pilot plant comprising a loop and a gas phase reactor was operated so that ethylene, propane diluent and hydrogen were introduced into a loop reactor together with a commercially available non-supported catalyst sold under trade name Lynx760 by Mallinkrodt. The operating temperature of the reactor was 95° C. and pressure 60 bar. Ethylene homopolymer was produced at a rate of 24 kg per hour and the $MFR_2$ of the polymer after the loop reactor was 600 g/10 min. Thus, the low molecular weight component was made in the loop reactor. The density of the polymer was not measured, but prior experience has indicated that a homopolymer of this MFR has a density of about 974 kg/m$^3$. The polymer slurry was withdrawn from the reactor and introduced into a separation stage where the hydrocarbons were removed from the polymer. The polymer containing the active catalyst was transferred into a gas phase reactor, where additional ethylene, hydrogen and 1-butene comonomer were added. The polymerization was thus continued to produce the high molecular weight component so that a polymer composition having a density of 945 kg/m$^3$ and the $MFR_{21}$ of 6.3 g/10 min. The polymer was withdrawn from the gas phase reactor at a rate of 59 kg per hour. The polymer was pelletised using a corotating twin screw extruder and analysed.

The pelletized product was then run into a film on a film line having die diameter 160 mm and die gap 1.5 mm. The blow-up ratio (BUR) was 4 and the frost line height equal to 8 die diameters (DD). The resulting film had neck of 150 mm (corresponding to an effective blow-up ratio $BUR_{eff}$ of 4.3), dart drop of 360 g, tear strength in machine and transverse directions 0.11 and 1.0 N respectively and 5 gels in an area of A4-size.

Comparative Example 1

A pilot plant comprising a loop and a gas phase reactor was operated according to Example 1, with the exception that a catalyst prepared according to Example 3 of PCT Patent Application WO-A-95/35323 was used. Catalyst feed was 15 g per hour. Ethylene homopolymer was produced at a rate of 28 kg per hour and the $MFR_2$ of the polymer after the loop reactor was 380 g/10 min.

Polymer was withdrawn from the gas phase reactor at a rate of 67 kg per hour. The $MFR_{21}$ of the final product was 9.7 g/10 min and the density was 945 kg/m$^3$.

The pelletized product was then run into a film as disclosed in Example 1. The film had neck of 135 mm, dart drop of 170 g, tear strength in machine and transverse directions 0.15 and 0.45 N respectively and 220 gels in an area of A4-size.

Comparative Example 2

A unimodal material produced using a Cr-catalyst (sold by Borealis under a trade name HE6960) was run into a film in a similar fashion than in Example 1. The material had $MFR_{21}$ 8 g/10 min and density 945 kg/m$^3$.

The resulting film had neck of 110 mm, dart drop of 150 g, tear strength in machine and transverse directions 0.2 and 0.5 N respectively and 10 gels in an area of A4-size.

What is claimed is:

1. A process for producing polyethylene compositions comprising bimodal ethylene homo- and copolymers in a multistage reaction sequence of successive polymerization stages in the presence of an ethylene-polymerizing catalyst system, said process comprising carrying out the process in at least one loop polymerization stage and at least one gas phase polymerization stage, operated with different amounts of hydrogen and comonomers to produce a high molecular weight portion in one of the polymerization stages and a low molecular weight portion in another to produce a polyethylene composition with the low molecular weight part having a $MFR_2$ of 250 g/10 min or more, wherein said catalyst system comprises an unsupported catalyst comprising magnesium and titanium as active constituents.

2. The process according to claim 1, comprising subjecting ethylene, optionally together with hydrogen and/or comonomers, in the presence of an unsupported catalyst system comprising magnesium and titanium as active constituents to a loop polymerization or copolymerization reaction in a first reaction zone or reactor to produce a polymer having a $MFR_2$ of 250 g/10 min or more, recovering the first polymerization product from the first polymerization zone, feeding the first polymerization product to a gas phase zone or reactor, feeding additional ethylene and optionally hydrogen and/or comonomers to the gas phase reaction zone, subjecting the additional ethylene and optionally additional monomer(s) and hydrogen to a second polymerization reaction in the presence of the first polymerization product to produce a second polymerization product having a $MFR_{21}$ of 50 g/10 min or less, and recovering the combined polymerization product from the gas phase reaction zone.

3. The process according to claim 1 or 2, wherein the catalyst is prepared by reacting an alcohol (C) with a magnesium compound (D) in order to obtain a magnesium complex (B), reacting an alkyl metal compound (A) with said magnesium complex (B) to form a magnesium chloride-metal complex (E), reacting the magnesium chloride-aluminium complex (E) with a titanium compound (F) in order to prepare a solid catalyst component, and optionally washing and drying the solid catalyst component.

4. The process according to claim 3, wherein the alcohol (C) comprises 2-ethyl-1-hexanol or 2-propyl-1-pentanol, or a mixture thereof.

5. The process according to claim 3, wherein the magnesium compound (D) comprises dialkyl magnesium, or a mixture thereof.

6. The process according to claim 3, wherein the molar ratio of the alcohol (C) to the magnesium compound (D) is in the range of 1.7–2.1.

7. The process according to claim 3, wherein the alkyl metal compound (A) has the general formula:

$$R_nMeCl_{3-n}$$

wherein each R is independently $C_1$–$C_{10}$ alkyl, Me is a metal of Group 13 in the Periodic Table of Elements, and n is an integer of 1 or 2.

8. The process according to claim 7, wherein the alkyl metal compound (A) is an aluminum dichloride.

9. The process according to claim 3, wherein the ratio of chlorine atoms in the compound (A) to the magnesium atoms in complex (B) is between 1 and 2.5.

10. The process according to claim 3, wherein the titanium compound (F) has the general formula $$TiCl_n(OR)_{4-n}$$

wherein n is an integer from 1 to 4, and in each OR group independently R is linear or branched saturated hydrocarbyl comprising 1–12 carbon atoms.

11. The process according to claim 10, wherein the titanium compound (F) is titanium tetrachloride.

12. The process according to claim 3, wherein the molar ratio of the titanium compound (F) to complex (B) is between 1:1.5–1:3.

13. The process according to claim 1, wherein the loop reactor is operated using a diluent selected from the group of linear or branched $C_4$–$C_6$-hydrocarbons and mixtures thereof.

14. The process according to claim 13, wherein the diluent is isobutane, n-butane, isopentane or a mixture thereof.

15. The process according to claim 1, wherein the comonomer is $C_4$–$C_{10}$ olefin, or a mixture thereof.

16. The process according to claim 1, wherein the density of the low molecular weight part is 960–980 kg/m³ and the density of the final polymer composition is 940–965 kg/m³.

17. The process according to claim 16, wherein the $MFR_2$ of the low molecular weight component is 300–1000 g/10 min and the $MFR_{21}$ of the final polymer composition is 3–50 g/10 min.

18. The process according to claim 16 or 17, wherein 5 to 95 wt-% of the ethylene homopolymer or copolymer is produced at conditions which provide a polymer having a $MFR_2$ of 300–1000 g/10 min.

19. The process according to claim 1, wherein the density of the low molecular weight part is 940–980 kg/m³ and the density of the final polymer composition is 930–965 kg/m³.

20. The process according to claim 19, wherein the $MFR_2$ of the low molecular weight part is 250–1000 g/10 min and the $MFR_{21}$ of the final polymer composition is 2–50 g/10 min.

21. The process according to claim 19 or 20, wherein 20–60 wt-% of the ethylene homopolymer or copolymer is produced at conditions to provide a polymer having a $MFR_2$ of 250–1000 g/10 min.

22. The process according to claim 1, wherein the density of the low molecular weight part is 940–980 kg/m³ and the density of the final polymer composition is 925–940 kg/m³.

23. The process according to claim 22, wherein the $MFR_2$ of the low molecular weight component is 250–1000 g/10 min and the $MFR_{21}$ of the final polymer composition is 7–30 g/10 min.

24. The process according to claim 22 or 23, wherein 5–95 wt-% of the ethylene homopolymer or copolymer is produced at conditions to provide a polymer having a $MFR_2$ of 250–1000 g/10 min.

25. The process according to claim 1, wherein the density of the low molecular weight part is 935–960 kg/m³ and the density of the final polymer composition is 915–930 kg/m³.

26. The process according to claim 25, wherein the $MFR_2$ of the low molecular part is 250–1000 g/10 min and the $MFR_{21}$ of the final polymer composition is 10–50 g/10 min.

27. The process according to claim 25 or 26, wherein 5–95 wt-% of the ethylene homopolymer or copolymer is produced at conditions to provide a polymer having a $MFR_2$ of 250–1000 g/10 min.

28. The process according to claim 1, wherein the final polymer composition has a $MFR_5$ of 0.7 g/10 min or less.

29. The process according to claim 1, wherein the final polymer composition has a $MFR_{21}$ of 20 g/10 min or less.

30. A process for producing high density polyethylene films, comprising producing a polyethylene composition in the presence of an ethylene-polymerizing catalyst system comprising an unsupported catalyst comprising magnesium and titanium as active constituents, in a multistage reaction sequence of successive polymerization stages, at least one of which is a loop polymerization stage and at least one of which is a gas phase polymerization stage, operated with different amounts of hydrogen and comonomers to produce a high molecular weight portion in one of the polymerization stages and a low molecular weight portion in another so as to provide a bimodal high density polyethylene with a low molecular weight part having a density above 960 kg/m$^3$ and a high molecular weight part, the composition having a density of 940–965 kg/m$^3$ and $MFR_{21}$ of 3–50 g/10 min, and blowing said polyethylene composition to a film.

31. A process for preparing medium density polyethylene films, comprising producing a polyethylene composition in the presence of an ethylene-polymerizing catalyst system comprising an unsupported catalyst comprising magnesium and titanium as active constituents, in a multistage reaction sequence of successive polymerization stages, at least one of which is a loop polymerization stage and at least one of which is a gas phase polymerization stage, operated with different amounts of hydrogen and comonomers to produce a high molecular weight portion in one of the polymerization stages and a low molecular weight portion in another so as to provide bimodal medium density polyethylene with a low molecular weight part having a density of 940–980 kg/m$^3$ and a high molecular weight part, the composition having a density of 925–940 kg/m$^3$ and $MFR_{21}$ of 7–30 g/10 min, and blowing said polyethylene composition to a film.

32. A process for preparing low density polyethylene films, comprising producing a polyethylene composition in the presence of an ethylene-polymerizing catalyst system comprising an unsupported catalyst comprising magnesium and titanium as active constituents, in a multistage reaction sequence of successive polymerization stages, at least one of which is a loop polymerization stage and at least one of which is a gas phase polymerization stage, operated with different amounts of hydrogen and comonomers to produce a high molecular weight portion in one of the polymerization stages and a low molecular weight portion in another so as to provide bimodal low density polyethylene with a low molecular weight part having a density of 935–960 kg/m$^3$, and a high molecular weight part, the polyethylene composition having a density of 915–930 and $MFR_{21}$ of 10–50 g/10 min or more, and blowing said polyethylene composition to a film.

33. The process according to any of claims 30–32, wherein the polyethylene composition is compounded and pelletized prior to blowing it to a film.

34. The process according to claim 30, wherein the film exhibits a number of gels lower than 50 in an area of A4 size.

35. The process according to claim 30, wherein a film with a thickness of 5–100 μm is produced.

36. The process according to claim 30, wherein the film has a dart drop higher than 200 g.

37. The process according to claim 7, wherein said Me is aluminum.

38. The process according to claim 17, wherein said $MFR_2$ of the low molecular weight component is 300–600 g/10 min.

39. The process according to claim 17, wherein said $MFR_{21}$ of the final polymer composition is 3–15 g/10 min.

40. The process according to claim 18, wherein 20 to 55 wt-% of said ethylene homopolymer or copolymer is produced at conditions which provide a polymer having a $MFR_2$ of 300–1000 g/10 min.

41. The process according to claim 18, wherein 35–50 wt-% of said ethylene homopolymer or copolymer is produced at conditions which provide a polymer having a $MFR_2$ of 300–1000 g/10 min.

42. The process according to claim 20, wherein the $MFR_2$ of the low molecular weight part is 300–600 g/10 min.

43. The process according to claim 20, wherein said $MFR_{21}$ of the final polymer composition is 3–15 g/10 min.

44. The process according to claim 21, wherein 30–50 wt-% of the ethylene homopolymer or copolymer is produced at conditions to provide a polymer having a $MFR_2$ of 250–1000 g/10 min.

45. The process according to claim 21, wherein 40–50 wt-% of the ethylene homopolymer or copolymer is produced at conditions to provide a polymer having a $MFR_2$ of 250–1000 g/10 min.

46. The process according to claim 23, wherein the $MFR_2$ of the low molecular weight component is 300–500 g/10 min.

47. The process according to claim 23, wherein said $MFR_{21}$ of the final polymer composition is 10–25 g/10 min.

48. The process according to claim 24, wherein 20–50 wt-% of the ethylene homopolymer or copolymer is produced at conditions to provide a polymer having a $MFR_2$ of 250–1000 g/10 min.

49. The process according to claim 24, wherein 35–50 wt-% of the ethylene homopolymer or copolymer is produced at conditions to provide a polymer having a $MFR_2$ of 250–1000 g/10 min.

50. The process according to claim 26, wherein said $MFR_2$ of the low molecular part is 300–500 g/10 min.

51. The process according to claim 26, wherein said $MFR_{21}$ of the final polymer composition is 15–25 g/10 min.

52. The process according to claim 27, wherein 20–50 wt-% of the ethylene homopolymer or copolymer is produced at conditions to provide a polymer having a $MFR_2$ of 250–1000 g/10 min.

53. The process according to claim 27, wherein 35–50 wt-% of the ethylene homopolymer or copolymer is produced at conditions to provide a polymer having a $MFR_2$ of 250–1000 g/10 min.

54. The process according to claim 1, wherein said different amounts of hydrogen and comonomers is at least 100 mol hydrogen/kmol ethylene in said loop reactor and less than 100 mole hydrogen/kmol ethylene in said gas phase reactor.

55. The process according to claim 30, wherein said different amounts of hydrogen and comonomers is at least 100 mol hydrogen/kmol ethylene in said loop reactor and less than 100 mole hydrogen/kmol ethylene in said gas phase reactor.

56. The process according to claim 31, wherein said different amounts of hydrogen and comonomers is at least 100 mol hydrogen/kmol ethylene in said loop reactor and less than 100 mole hydrogen/kmol ethylene in said gas phase reactor.

57. The process according to claim 32, wherein said different amounts of hydrogen and comonomers is at least 100 mol hydrogen/kmol ethylene in said loop reactor and less than 100 mole hydrogen/kmol ethylene in said gas phase reactor.

* * * * *